United States Patent
Thirunavukkarasu

(10) Patent No.: US 11,657,409 B2
(45) Date of Patent: May 23, 2023

(54) SYSTEM AND METHOD FOR PRODUCT DEMAND TRANSFER ESTIMATION THROUGH MACHINE LEARNING

(71) Applicant: Tata Consultancy Services Limited, Mumbai (IN)

(72) Inventor: Jeisobers Thirunavukkarasu, Chennai (IN)

(73) Assignee: TATAT CONSULTANCY SERVICES LIMITED, Mumbai (IN)

( * ) Notice: Subject to any disclaimer, the term of this patent is extended or adjusted under 35 U.S.C. 154(b) by 295 days.

(21) Appl. No.: 16/700,760

(22) Filed: Dec. 2, 2019

(65) Prior Publication Data

US 2020/0211037 A1    Jul. 2, 2020

(30) Foreign Application Priority Data

Dec. 31, 2018  (IN) .............................. 201821049993

(51) Int. Cl.
*G06Q 30/0202* (2023.01)
*G06N 20/00* (2019.01)
*G06Q 30/0204* (2023.01)

(52) U.S. Cl.
CPC ......... *G06Q 30/0202* (2013.01); *G06N 20/00* (2019.01); *G06Q 30/0204* (2013.01)

(58) Field of Classification Search
None
See application file for complete search history.

(56) References Cited

U.S. PATENT DOCUMENTS

| | | | |
|---|---|---|---|
| 6,035,284 A | 3/2000 | Straub et al. | |
| 9,805,333 B1 | 10/2017 | Bergstrom et al. | |
| 10,997,615 B1* | 5/2021 | Alvarez | G06Q 10/0637 |
| 2012/0303411 A1* | 11/2012 | Chen | G06Q 10/087 705/7.31 |
| 2016/0260110 A1* | 9/2016 | Ray | G06Q 30/0202 |
| 2016/0335586 A1* | 11/2016 | Panchamgam | G06Q 10/087 |
| 2017/0061452 A1* | 3/2017 | Mukherjee | G06Q 30/0202 |

(Continued)

OTHER PUBLICATIONS

Im et al., GPLOM: The Generalized Plot Matrix for Visualizing Multidimensional Multivariate Data, IEEE Transactions on Visualization and Computer Graphics, (vol. 19, Issue: 12, Dec. 2013) (Year: 2013).*

*Primary Examiner* — Chesiree A Walton
(74) *Attorney, Agent, or Firm* — Finnegan, Henderson, Farabow, Garrett & Dunner, LLP

(57) ABSTRACT

This disclosure relates to a system and method to estimate demand transfer of a product while considering performance of all the products of a category simultaneously. It would be appreciated that the demand of a removed product transfers to other products of same category in a store. In addition the demand transfer is influenced by sales drivers such as product level promotion and competitor prices, store location, weather and seasonality. By considering these factors the proposed approach provides a method to estimate demand transfer of a product. It is addressed by creating multivariate multi structure machine learning models and estimating demand transfer values by using suitable scenario generator for product availability. It enables to estimate more holistic demand transfer values by simultaneous consideration of individual product behaviours with respect to other products availability and other sales drivers.

9 Claims, 5 Drawing Sheets

(56) References Cited

U.S. PATENT DOCUMENTS

2018/0349740 A1* 12/2018 Schneider ............... H04L 9/008
2019/0012682 A1*  1/2019 Shariff .................... G06F 16/00
2019/0180301 A1*  6/2019 Mahalanobish ........ H04W 4/35

* cited by examiner

SYSTEM AND METHOD FOR PRODUCT DEMAND TRANSFER ESTIMATION THROUGH MACHINE LEARNING

CROSS-REFERENCE TO RELATED APPLICATIONS AND PRIORITY

This U.S. patent application claims priority under 35 U.S.C. § 119 to India Application No. 201821049993, filed on 31 Dec. 2018. The entire contents of the abovementioned application are incorporated herein by reference.

TECHNICAL FIELD

The disclosure herein generally relates to a field of demand transfer estimation of a product and, more particularly, a system and method for demand transfer estimation through a machine learning model.

BACKGROUND

In retail scenario number of products of a category is keep on increasing due to increase in customer preferences and competition. However retailers have limited space for a category, Category manager has the option to choose more profitable and customer specific products so that he can accommodate those products within the limited space and at the same time he could satisfy the customer. The demand of the removed products will shift to the products that are going to be kept in the store. The demand shift will vary depending on nature of product absence such as individual absence of product, simultaneous absence of products and sales drivers such as promotion, competitor pricing, store demographics, competitor location, weather and seasonality. Two points need to be considered. Firstly simultaneous consideration of performance of all products during demand transfer estimation will help to reflect product interactions during customer purchase decision making and secondly, simultaneous consideration of major causative factors that are accountable for occurrence of demand transfer is critical to find more accurate demand transfer value. Current technology could not consider these two points.

In addition, existing methods require product attributes that are responsible for product sales. As the number of attributes for a category are many and it will create bias while choosing those attribute which are responsible for the category sales. In addition some of the categorical attribute will have many distinct values which need to be bucketed for demand transfer estimation. For example yoghurt category may have two hundred flavors and as per usual modeling requirement, it needs to be grouped to have lesser number of distinct values. Similarly, numerical attribute such as size, it needs to be bucketed to bring lesser number of distinct values. It is challenging and will create bias based on user decision making during bucketing. The sales drivers for a category are plenty and captured in different formats. The challenge is that they need to be processed in a granular level such that all the sales drivers are able to explain the variation of sales as much as possible. Sound data processing system is critical for the accuracy of demand transfer estimation.

Thus, the disclosure herein provides systems and methods to address the above points. By considering all these factors the disclosure suggest an approach of estimating the demand transfer. Based on amount of transfer, products are rationalized which could lead to assortment decision.

SUMMARY

Embodiments of the present disclosure provides technological improvements as solutions to one or more of the above-mentioned technical problems recognized by the inventors in conventional systems. For example, in one embodiment, a method and system for estimating demand transfer of a product while considering one or more other products of the same category.

A processor-implemented method to estimate a demand transfer of each of one or more products while considering sales performance of each of the one or more products of the same category simultaneously. The method comprises one or more steps as collecting a set of drivers of sales of one or more products, wherein the one or more products are of a predefined category from one or more sources. Further, the collected set of drivers of the one or more products are aggregated alongside a pre-recorded sale of each product within a predefined time period. Furthermore, generating a data matrix of the aggregated set of drivers to provide a multivariate multi-structure. Herein, the sales drivers along with inventory will form an independent matrix. Further, processing the aggregated data from the collected set of drivers of sales of the plurality of a predefined category and a recorded sales of each product within a predefined time period to facilitate the data matrix to improve demand transfer accuracy. The multivariate multi-structure machine learning model is used to analyze the processed data to enable simultaneous consideration of each of the one or more products behavior with respect to other products availability. One or more scenarios are generated using one or more missing products and the aggregated set of drivers of sales of the one or more products of the predefined category and estimating a sale of each product corresponding to availability of inventory of each of the one or more products of the predefined category and the generated one or more scenarios. Finally, a demand transfer is estimated for each product through the sales estimation of each product using the one or more generated scenarios and using the estimated sale of each product corresponding to availability of inventory of each of the one or more products of the predefined category.

A system is configured to estimate a demand transfer of each of one or more products while considering sales performance of each of the one or more products of a predefined category. The system comprising at least one memory storing a plurality of instructions and one or more hardware processors communicatively coupled with the at least one memory. The one or more hardware processors are configured to execute one or more modules comprises of a data collection module, a data aggregation module, a data matrix generation module, a structure facilitation module, a model development module, a scenario generation module, a sale estimation module, and a demand transfer estimation module. The data collection module is configured to collect a set of drivers of sales of one or more products of a predefined category from one or more sources. The data aggregation module is configured to aggregate the collected set of drivers of the one or more products alongside a pre-recorded sales of each product within a predefined time period. The data matrix generation module configured to generate a data matrix of the aggregated set of drivers to provide a multivariate multi-structure data matrix. The structure facilitation module is configured to process the aggregated data of the collected set of drivers of sales of a predefined category and a recorded sales of each product within a predefined time period to facilitate the data matrix to improve demand transfer accuracy. The model development module is configured to analyze the processed data into a multivariate multi-structure machine learning model to enable simultaneous consideration of each of the one or more products behavior with respect to other products availability. Furthermore, the scenario generation module is configured to generate one or more scenarios using one or more missing products and aggregated set of drivers of sales of the one or more products of the predefined category. The sale estimation module of the system is configured to estimate a sale of each product corresponding to availability of inventory of each of the one or more products of the predefined category through the generated one or more scenarios. Finally, the demand transfer estimation module is configured to estimate a demand transfer of each product using the estimated sales performance of each of the one or more products.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
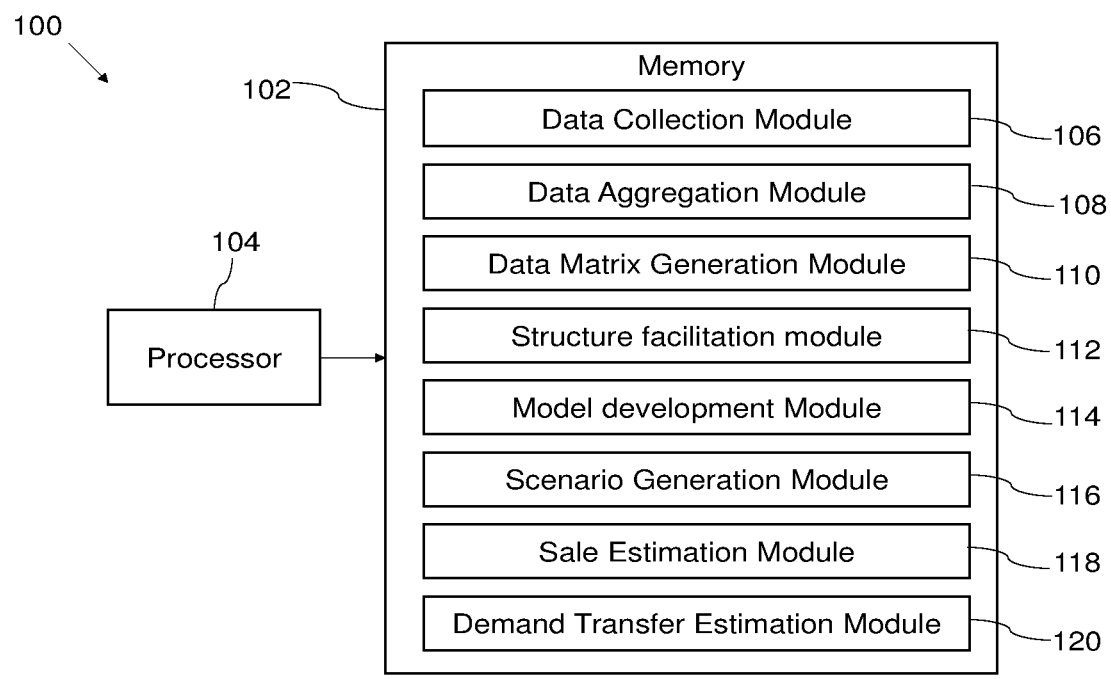
FIG. 1 illustrates a system to estimate a demand transfer of products while considering performance of each product of the same category simultaneously, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system to estimate a demand transfer of each of the one or more products while considering sales performance of each of the one or more products of a predefined category simultaneously. It would be appreciated that the demand transfer estimation herein involves inter dependency between the one or more products of the predefined category and one or more sales drivers as a causative factors while demand transfer estimation.

Referring now to the drawings, and more particularly to FIG. 1 through FIG. 4, where similar reference characters denote corresponding features consistently throughout the figures, these are shown preferred embodiments and these embodiments are described in the context of the following exemplary system and/or method.

FIG. 1 illustrates a system (100) to estimate a demand transfer of one or more products while considering sales performance of each of the one or more products of a predefined category simultaneously. In the preferred embodiment, the system (100) comprises at least one memory (102) with a plurality of instructions and one or more hardware processors (104) which are communicatively coupled with the at least one memory (102) to execute modules therein.

The one or more hardware processors (104) may be implemented as one or more microprocessors, microcomputers, microcontrollers, digital signal processors, central processing units, state machines, logic circuitries, and/or any devices that manipulate signals based on operational instructions. Among other capabilities, the one or more hardware processors (104) is configured to fetch and execute computer-readable instructions stored in the memory (102). Further, the system comprises a data collection module (106), a data aggregation module (108), a data matrix generation module (110), a structure facilitation module (112), a model development module (114), a scenario generation module (116), a sale estimation module (118), and a demand transfer estimation module (120).

In the preferred embodiment of the disclosure, the data collection module (106) of the system (100) is configured to collect a set of drivers of sales of a one or more products of a predefined category from one or more sources. The one or more sources includes a point of sale (POS), an inventory management, a historical promotion, a competitor information, store category level demographic information and store level weather information.

Figure 2:
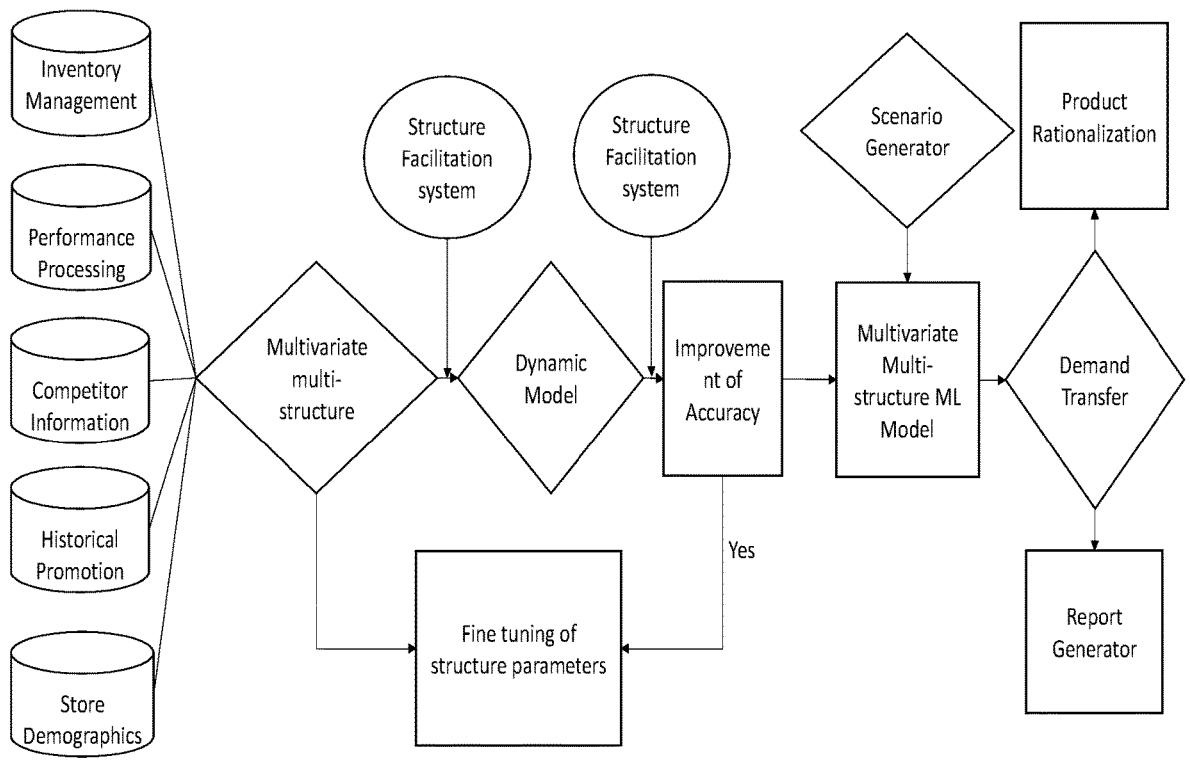
FIG. 2 is a schematic to estimate a demand transfer of products while considering performance of each product, in accordance with some embodiments of the present disclosure.

Referring FIG. 2, a schematic diagram, wherein the data collection module of the system (100) collects a set of drivers of sales together at different format and levels. It would be appreciated that the one or more sources includes an inventory management, performance processing, competition information, historical promotions, and store demographics. It would be appreciated that the one or more sources are not limited to above list. It may also comprise market share, customer lifestyle, customer behavior, and weather and seasonality. Some of the sources such as inventory are from the retailer and some of them are from third party vendors. All the sources will have different format and different level of information.

Further, the data collection module (106) of the system (100) is enabled to process the data in a meaningful way to improve accuracy of demand transfer estimation. All the collected information is processed in a level such that the sales is better explained by the causative factors. In one instance, the inventory information is aggregated at day level or week level depending on the sales explain ability by inventory. Similar approach is followed for other sales drivers.

In the preferred embodiment of the disclosure, the data aggregation module (108) of the system (100) is configured to aggregate the collected set of drivers of sales of the one or more products of the predefined category and a pre-recorded sales of each product within a predefined time period. It would be appreciated that the set of drivers of sales include a demographic data associated with the plurality of products, historical product level promotion information and a recorded information of one or more competitors of the plurality of products.

The process of aggregation of one or more products considered, depends on input selection of a user i.e. the category which the user interested to find demand transfer value. It would be appreciated that the collected information is aggregated at hourly or day or week level. The level of aggregation is depending on the input received and number and pattern of missing products in the inventory.

In the preferred embodiment of the disclosure, the data matrix generation module (110) of the system (100) is configured to generate a data matrix of the aggregated set of drivers of sales to provide a multivariate multi-structure. The data matrix comprises a plurality of columns and rows of the aggregated set of drivers of sales of the plurality of products of the predefined category and the recorded sales of each product within the predefined time period. Further, the data matrix is classified in an independent matrix and a dependent matrix. The dependent matrix structure captures sales performance of individual products simultaneously and the independent matrix has all causative factors available with retailer.

It is to be noted that the set of drivers of sales along with the inventory forms the independent matrix. A number of rows in the independent matrix depends on level of aggregation either on a day or a week or a month level which depends on business behavior that exist for a concerned category product.

In one example, wherein one or more categories having fast moving items will provide better explain ability of sales when day level aggregation is followed and in contrast slow moving items will be better explained by higher level of aggregation. The number of columns of the independent matrix depends on the factors considered such as inventory, promotion, competitor price distance, demographic, competitor spread, weather and seasonality. The independent matrix ensures simultaneous consideration of all causative factors that are available with retailers while estimating demand transfer.

In another example, wherein if the inventory, promotion and competitor price distance are collected at individual product level then there are n products within a category and these three factors will form 3n columns in the independent matrix. Further, the demographic, competitor spread, weather are processed at individual store level and seasonality acts as an indicator variable and would be noted accordingly. The inventory has binary values based on respective product availability and the promotion has percentage of discounts applied. The competitor price distance may have the difference in price between the retailer price followed in the store and online price followed by the competitor and the maximum price distance is found by comparing all competitor prices and so each product will have one maximum price distance. Demographic data will have trade level demographic information surrounding each store and usually they are purchased from third party vendors by retailers.

In addition to this, the demographic variables are category specific and it has to be mapped as per the category interested. The number of columns from the demographic data would be equal to number of demographic and number of rows is equal to number of stores. However, it is to be replicated as per level of aggregation either on a day level or a month level. For each store competitor, the information on the demographic variables are processed and that may vary based on category. Further, the competition intensity is derived based on type of major competitors and their distance from the retailers. The competition intensity would vary depending on category. Weather is processed and aggregated at individual store level. The number of columns is three such as an average day level temperature, an average precipitation and an average humidity. The seasonality is indicated by using indicator variable such as weekdays and month.

In the dependent matrix, it comprises number of columns that equal to number of products and each column represents individual product sales. This set up ensures simultaneous consideration of all the products while capturing products behavior within a category. Both independent and dependent matrix form a multivariate multi-structure.

Once the data is aggregated at the optimal aggregation levels, for a predefined aggregation level the data is represented in the form of a data matrix, which represents data in a format for machine learning to generate the estimation model. The data matrix captures the interaction effect that happens within products themselves. Similarly, major sales drivers and inventory details of the one or more products are represented in the multivariate multi-structure. It is to be noted that the dependent and independent matrix structure enables to capture interaction effect that exist in business scenarios. Furthermore, at first, the predefined aggregation level can be approximated based on the speed sales movement of an inventory stock for an entity. For the predefined aggregation level for the product category, the system is configured to generate an estimation model using the data matrix.

In the preferred embodiment of the disclosure, the structure facilitation module (112) of the system (100) is configured to process the aggregated data to facilitate more meaningful inputs. In one example wherein, a retailer price for product 1 is compared with price of all competitors and the difference is calculated for each competitor. Among the differences of each competitor the maximum difference is pulled out and passed as 'product 1 max price distance online' which is one column under competition. Similarly it is generated for all the products. Both the independent and dependent matrix is passed into the multivariate multi-structure machine learning model. In other words simultaneous consideration of all causative factors is mapped with simultaneous consideration of the product performance through machine learning algorithm. This set up tries to learn the business behavior that exist in the passing information.

In the preferred embodiment of the disclosure, the model development module (114) of the system (100) is configured to establish a model by passing the data of the multivariate multiple structure matrix to a multivariate multi-structure machine learning model and by repeated iterations finding out the optimal time frame for aggregation and removing of noise observations.

It is to be noted that the multivariate multi-structure data matrix is passed into the multivariate multi-structure machine learning model and sales estimation is done to fine tune the sales performance of each of the one or more products. Error between the estimated product sales and actual product sales is determined and optimal aggregation level in which error will be minimal is identified and the same logic is applied wherever is applicable. It takes many iterations to stabilize and find optimal model structure as the model depends on one or more sales drivers and inventory availability. Once optimal structure is stabilized, the structure undergoes leaning process. In an embodiment, wherein the system learns how sales happens at individual product level when all the products are available as well as when some of the products are missing while considering all other causative factors. However this example will vary depending on how the past historical information is happened. The success of learning depends on the period of data used for learning and ideally it needs to be as long as possible and it should capture all possible scenarios that exist in real retail scenarios. The model with learnt behavior is ready to be used to estimate sales pattern across products for different scenarios.

In the preferred embodiment of the disclosure, the scenario generation module (116) of the system (100) is configured to generate one or more scenarios by simulating one or more products are missing and aggregated set of drivers of sales of the one or more products of the predefined category. It is to be noted that the system may generate one or more different scenarios of missing products. Referring below tables 1 & 2, as an example, wherein in one scenario, it generates the first row as the one or more products are present and next row product_1 is missing (0) and the remaining products (product_2 through product_10) are made available to product_1. It could be appreciated that as single product missing scenario. It can be repeated for all other products.

TABLE 1

| Product_1 | Product_2 | Product_3 | Product_4 | Product_5 | Product_6 | Product_7 | Product_8 | Product_9 | Product_10 |
|---|---|---|---|---|---|---|---|---|---|
| 1 | 1 | 1 | 1 | 1 | 1 | 1 | 1 | 1 | 1 |
| 0 | 1 | 0 | 1 | 1 | 0 | 1 | 1 | 1 | 1 |
| 1 | 0 | 1 | 1 | 1 | 1 | 1 | 1 | 1 | 1 |
| 1 | 0 | 0 | 1 | 1 | 1 | 1 | 1 | 1 | 1 |
| 1 | 1 | 1 | 0 | 1 | 1 | 1 | 1 | 1 | 1 |
| 1 | 0 | 0 | 0 | 0 | 1 | 1 | 1 | 0 | 1 |
| 1 | 1 | 1 | 0 | 1 | 0 | 1 | 1 | 1 | 1 |
| 0 | 1 | 1 | 1 | 1 | 1 | 0 | 1 | 1 | 1 |
| 1 | 1 | 1 | 1 | 1 | 1 | 1 | 0 | 1 | 0 |
| 1 | 1 | 1 | 1 | 1 | 1 | 1 | 1 | 0 | 1 |
| 1 | 1 | 1 | 0 | 1 | 0 | 1 | 1 | 1 | 0 |

In the preferred embodiment of the disclosure, the sale estimation module (118) of the system (100) is configured to estimate sale of each product corresponding to availability of inventory of each of the one or more products of the predefined category and the generated one or more scenarios. The sale estimation module (118) provides an estimated sales for each product at the predefined aggregation level.

Referring table 2, as one example, wherein first row of the tabular column is the sample scenario 1 when all products are present with the predicted sales and the second row is the sample scenario 1 when Product_1 is missing with the predicted sales.

TABLE 2

Sample Scenario 1

| Prod_1 | Prod_2 | Prod_3 | Prod_4 | Prod_5 | Prod_6 | Prod_7 | Prod_8 | Prod_9 | Prod_10 |
|---|---|---|---|---|---|---|---|---|---|
| 1 | 1 | 1 | 1 | 1 | 1 | 1 | 1 | 1 | 1 |
| 0 | 1 | 1 | 1 | 1 | 1 | 1 | 1 | 1 | 1 |

Predicted Sales

| Prod_1 | Prod_2 | Prod_3 | Prod_4 | Prod_5 | Prod_6 | Prod_7 | Prod_8 | Prod_9 | Prod_10 |
|---|---|---|---|---|---|---|---|---|---|
| 0.569 | 0.556 | 0.497 | 0.439 | 0.392 | 0.344 | 0.295 | 0.242 | 0.188 | 0.099 |
| 0 | 0.585 | 0.533 | 0.472 | 0.428 | 0.363 | 0.34 | 0.216 | 0.136 | 40 |

In the preferred embodiment of the disclosure, the demand transfer estimation module (120) of the system (100) is configured to estimate a demand transfer of each product using the sales estimation of each product. It would be appreciated that a demand transfer report is prepared to provide more visibility on demand transference that happens across different products.

Referring table 3, as one example, wherein when product_1 is missing the predicted sales of product_1 comes down to 0. At the same instance sales of remaining products (product_2 to product_10) has gone up. It indicates certain percentage of sales of product_1 has moved to the remaining available products due to its non-availability. Difference between the predicted sales when all products are present and the when product_1 alone is missing is calculated. Using this difference as the base, demand transfer values from product_1 to other products are derived. The same procedure is repeated for other products by using respective missing scenarios.

The data matrix comprises a plurality of columns and rows of the aggregated set of drivers of sales of the plurality of products of the predefined category and the recorded sales of each product within the predefined time period.

In the preferred embodiment of the disclosure, at the next step (208), processing the collected data at a structure facilitation module (112) of the system (100) to facilitate more meaningful inputs. In one example, wherein the retailer price for product 1 is compared with price of all competitors and the difference is calculated for each competitor. Among the differences of each competitor the maximum difference is pulled out and noted as 'Product 1 maximum price distance online'. Similarly it is noted for all the products. Processing the data to bring more meaningful input at a structure facilitation module (112) of the system (100).

In the preferred embodiment of the disclosure, at the next step (210), a model is established by passing the matrix inputs to a multivariate multi-structure machine learning

TABLE 3

| Sample Scenario 1 | | | | | | | | | | Predicted Sales |
|---|---|---|---|---|---|---|---|---|---|---|
| Prod_1 | Prod_2 | Prod_3 | Prod_4 | Prod_5 | Prod_6 | Prod_7 | Prod_8 | Prod_9 | Prod_10 | Prod_1 |
| 1 | 1 | 1 | 1 | 1 | 1 | 1 | 1 | 1 | 1 | 0.569 |
| 0 | 1 | 1 | 1 | 1 | 1 | 1 | 1 | 1 | 1 | 0 |
| Difference in predicted sales | | | | | | | | | | −0.569 |
| Demand Trnsfer from Product 1 to other products | | | | | | | | | | −100.00% |
| Demand Trnsfer from Product 1 to other products (Absolute Value) | | | | | | | | | | 100.00% |

| Predicted Sales | | | | | | | | |
|---|---|---|---|---|---|---|---|---|
| Prod_2 | Prod_3 | Prod_4 | Prod_5 | Prod_6 | Prod_7 | Prod_8 | Prod_9 | Prod_10 |
| 0.556 | 0.497 | 0.439 | 0.392 | 0.344 | 0.295 | 0.242 | 0.188 | 0.099 |
| 0.585 | 0.533 | 0.472 | 0.428 | 0.363 | 0.34 | 0.283 | 0.216 | 0.136 |
| 0.029 | 0.036 | 0.033 | 0.036 | 0.019 | 0.045 | 0.041 | 0.028 | 0.037 |
| 5.10% | 6.33% | 5.80% | 6.33% | 3.34% | 7.91% | 7.21% | 4.92% | 6.50% |
| 5.10% | 6.33% | 5.80% | 6.33% | 3.34% | 7.91% | 7.21% | 4.92% | 6.50% |

Figure 3A:
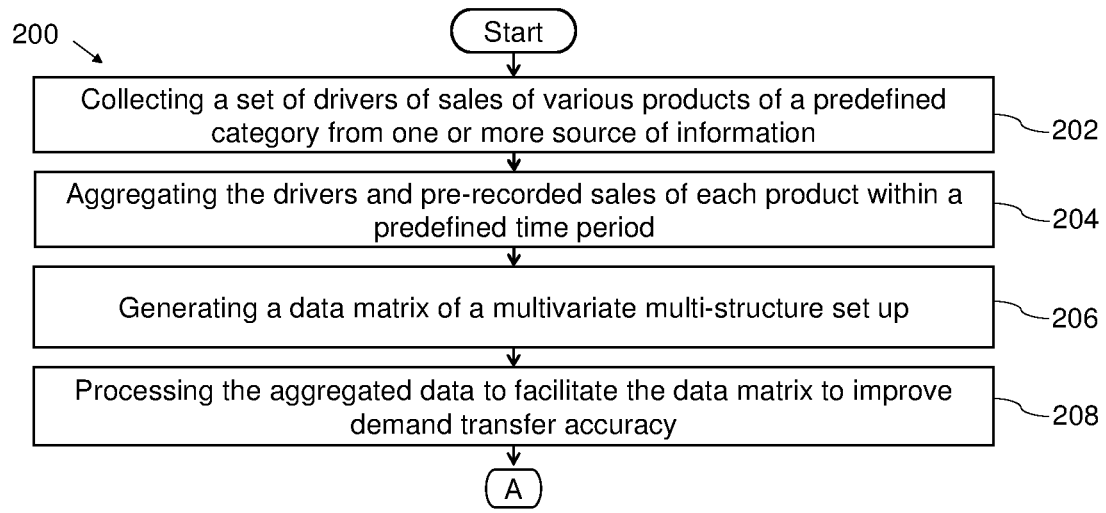
FIGS. 3(a) & 3(b) is a flow diagram to illustrate a method to estimate a demand transfer of products while considering performance of each product of the same category simultaneously, in accordance with some embodiments of the present disclosure.
Figure 3B:
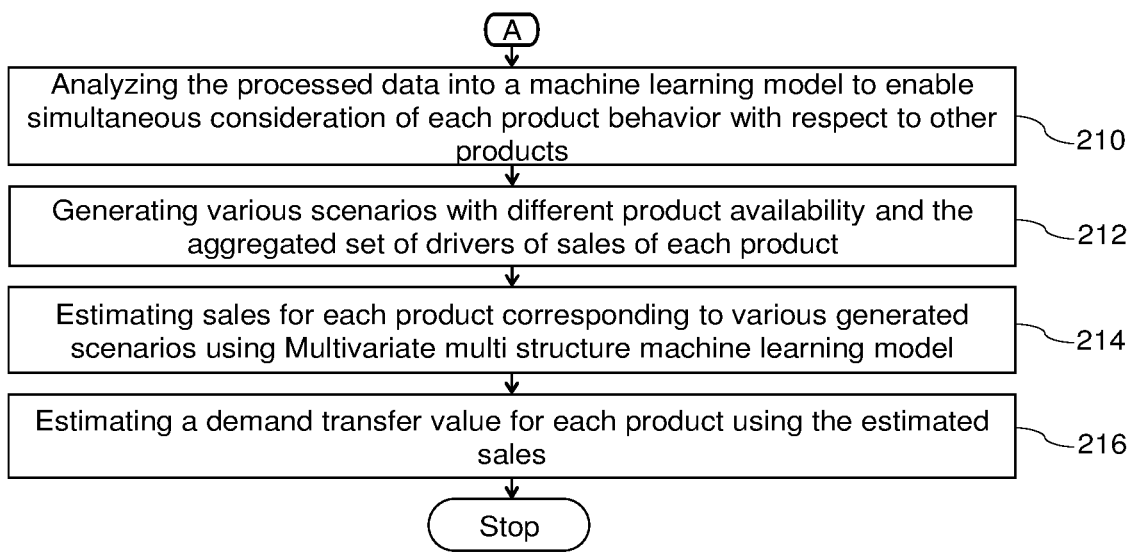

Referring FIGS. 3(a) & 3(b), a processor-implemented method (200) to estimate a demand transfer of each of the one or more products while considering sales performance of each of the one or more products of a predefined category simultaneously. The method comprises one or more steps as follows.

Initially, at the step (202), a set of drivers of sales of one or more products of a predefined category are collected at a data collection module (106) of the system (100) from one or more sources. The one or more sources includes a point of sale (POS), an inventory management, a historical promotion, a competitor information, store category level demographic information and store level weather information.

In the preferred embodiment of the disclosure, at the next step (204), aggregating at a data aggregation module (108) of the system (100) the collected set of drivers of sales of the plurality of a predefined category and a pre-recorded sale of each product within a predefined time period. It would be appreciated that the set of drivers of sales include a demographic data associated with the plurality of products, historical product level promotion information, and a recorded information of one or more competitors of the plurality of products.

In the preferred embodiment of the disclosure, at the next step (206), generating a data matrix of the aggregated set of drivers of sales at a data matrix generation module (110) of the system (100) to provide a multivariate multi-structure.

model and by repeated iterations finding out the optimal time frame for aggregation and removing of noise observations at a model development module (114) of the system (100).

In another aspect, a non-transitory computer readable medium (300) storing one or more instructions which when executed by a processor on a system, cause the processor to perform method comprising one or more steps as collecting a set of drivers of sales of one or more products, wherein the one or more products are of a predefined category from one or more sources. Further, the collected set of drivers of the one or more products are aggregated alongside a pre-recorded sale of each product within a predefined time period. Furthermore, generating a data matrix of the aggregated set of drivers to provide a multivariate multi-structure. Herein, the sales drivers along with inventory will form an independent matrix. Further, processing the aggregated data from the collected set of drivers of sales of the plurality of a predefined category and a recorded sales of each product within a predefined time period to facilitate the data matrix to improve demand transfer accuracy. The multivariate multi-structure machine learning model is used to analyze the processed data to enable simultaneous consideration of each of the one or more products behavior with respect to other products availability. One or more scenarios are generated using one or more missing products and the aggregated set of drivers of sales of the one or more products of the predefined category and estimating a sale of each product corresponding to availability of inventory of each of the one or more products of the predefined category and the generated one or more scenarios. Finally, a demand transfer is estimated for each product through the sales estimation of each product using the one or more generated scenarios and using the estimated sale of each product corresponding to availability of inventory of each of the one or more products of the predefined category.

In the preferred embodiment of the disclosure, at the next step (212), post optimal structure creation, generating one or more scenarios by simulating one or more missing products. In one example, a huge volume of reasonable period of data is passed into the multivariate multi-structure machine learning model to learn the latest business behavior and to be stored/kept in the memory. The period of data may be critical and may vary depending on category. This is critical as it will decide the accuracy of demand transfer estimation.

In the preferred embodiment of the disclosure, at the step (214), predicting a sale of each product corresponding to availability of inventory of each of the one or more products of the predefined category at a sale estimation module (118) of the system (100) using the generated one or more scenarios and aggregated set of drivers of sales of the one or more products of the predefined category.

In the preferred embodiment of the disclosure, at the last step (216), a demand transfer of each of the one or more products is estimated at an estimation module (120) of the system (100) using the sales estimation of each product.

Figure 4:
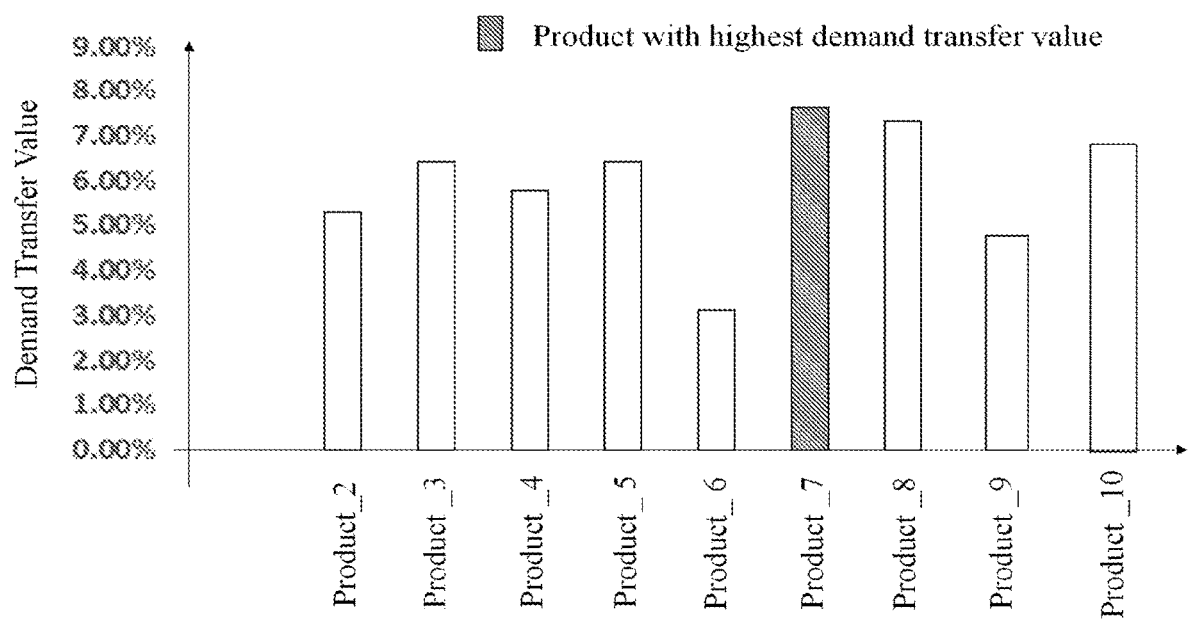
FIG. 4 is a schematic diagram to present a demand transfer value of one product while considering performance of one or more other products, in accordance with some embodiments of the present disclosure.

Referring FIG. 4, a schematic graph, showing the demand transfer values from product_1 to other products when product_1 is missing. The graph shows that product_7 has the maximum demand transfer values. In the past if product_1 has been given x facings, 7.9% of x facings is going to shift to product_7. So if product_7 is recommended with y facings, then it needs to be modified as y+(7.9%*x), where the additional part i.e. (7.9%*x) comes from the demand transfer that happens from product_1. Similarly the modifications in the number of facings for other products is calculated using the demand transfer values.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of assortment of products because the number of products of a category is keep on increasing but the retailers have limited space for a category. The present disclosure provides a system and method to estimate a demand transfer of products while considering performance of each product of the same category simultaneously.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system comprising:
at least one memory storing a plurality of instructions;
one or more hardware processors communicatively coupled with the at least one memory, wherein the one or more hardware processors are configured to:
collect a set of drivers of sales of a plurality of products of a predefined category from one or more source of information, wherein the one or more sources include a point of sale (POS), an inventory management, a historical promotion, a competitor information, store category level demographic information and a store level weather information;
aggregate the collected set of drivers of sales of the plurality of a predefined category and a recorded sales of each product within a predefined time period, wherein the set of drivers of sales include a demographic data associated with the plurality of products, and a recorded information of one or more competitors of the plurality of products, the inventory management, the historical promotion, and the weather;
generate a data matrix of the aggregated set of drivers to provide a multivariate multi-structure, wherein the data matrix comprises a plurality of columns and rows of the aggregated set of drivers of sales of the plurality of products of the predefined category and the recorded sales of each product within the predefined time period, wherein the data matrix includes an independent matrix and a dependent matrix, and wherein the independent matrix comprises number of rows that depends on a level of aggregation on a day or a week or a month;
process the aggregated data of the collected set of drivers of sales of a predefined category and a recorded sales of each product within a predefined time period to facilitate the data matrix to improve demand transfer accuracy;
analyze the processed data using a multivariate multi-structure machine learning model to enable simultaneous consideration of each of the one or more products behavior with respect to other products availability, wherein the multivariate multi-structure machine learning model is generated by passing the data matrix into the multivariate multi-structure machine learning model;
generate one or more scenarios by simulating one or more missing products and aggregated set of drivers of sales of the one or more products of the predefined category;
estimate a sale of each product corresponding to availability of inventory of each of the one or more products of the predefined category and the generated one or more scenarios using the multivariate multi-structure machine learning model, wherein the multivariate multi-structure machine learning model is learnt to estimate sales pattern across products for different scenarios by:
determining error between the estimated product sale and actual product sale;
identifying an optimal aggregation level in which the error is minimal by performing repeated iterations;
iteratively finding and stabilizing an optimal multivariate multi-structure based on the identified optimal aggregation level for the different scenarios; and
iteratively learning the multivariate multi-structure machine learning model based on the optimal multivariate multi-structure for the different scenarios and sales performance at individual product level when all products are available and when some of the products are missing while considering all other available causative factors; and
estimate a demand transfer of each product using the estimated sale of each of the one or more products.

2. The system of claim 1, wherein the independent matrix forms with the set of drivers of sales along with the inventory of each of the one or more products.

3. The system of claim 1, wherein the dependent matrix comprises number of columns that equal to number of products and each column represents individual product sales.

4. The system of claim 1, wherein the demand transfer value is used to modify the facings which is in proportion to the demand transfer values and also to provide visibility on demand transference that happens across different products.

5. A processor-implemented method comprising:
collecting, via one or more hardware processors, a set of drivers of sales of a plurality of products of a predefined category from one or more sources of information, wherein the one or more source of information includes a point of sale (POS), an inventory management, a historical promotion, a competitor information, a demography of the point of sale and store level weather information;
aggregating, via one or more hardware processors, the collected set of drivers of sales of the plurality of a predefined category and a recorded sales of each product within a predefined time period, wherein the set of drivers of sales include a demographic data associated with the plurality of products and a recorded information of one or more competitors of the plurality of products;
generating, via one or more hardware processors, a data matrix of the aggregated set of drivers to provide a multivariate multi-structure, wherein the data matrix comprises a plurality of columns and rows of the aggregated set of drivers of sales of the plurality of products of the predefined category and the recorded sales of each product within the predefined time period, wherein the data matrix includes an independent matrix and a dependent matrix, and wherein the independent matrix comprises number of rows that depends on a level of aggregation on a day or a week or a month;
processing, via one or more hardware processors, the aggregated data from the collected set of drivers of sales of the plurality of a predefined category and a recorded sales of each product within a predefined time period to facilitate the data matrix to improve demand transfer accuracy;
analyzing, via one or more hardware processors, the processed data using a multivariate multi-structure machine learning model to enable simultaneous consideration of each of the one or more products behavior with respect to other products availability, wherein the multivariate multi-structure machine learning model is generated by passing the data matrix into the multivariate multi-structure machine learning model;
generating, via one or more hardware processors, one or more scenarios by simulating one or more missing products and the aggregated set of drivers of sales of the one or more products of the predefined category;
estimating, via one or more hardware processors, a sale of each product corresponding to availability of inventory of each of the one or more products of the predefined category and the generated one or more scenarios using the multivariate multi-structure machine learning model, wherein the multivariate multi-structure machine learning model is learnt to estimate sales pattern across products for different scenarios by:

determining error between the estimated product sale and actual product sale;

identifying an optimal aggregation level in which the error is minimal by performing repeated iterations;

iteratively finding and stabilizing an optimal multivariate multi-structure based on the identified optimal aggregation level for the different scenarios; and iteratively learning the multivariate multi-structure machine learning model based on the optimal multivariate multi-structure for the different scenarios and sales performance at individual product level when all products are available and when some of the products are missing while considering all other available causative factors; and estimating, via one or more hardware processors, a demand transfer of each product using the estimation of each product using the one or more generated scenarios and estimated sale of each product corresponding to availability of inventory of each of the one or more products of the predefined category.

6. The method of claim 5, wherein the independent matrix forms with the set of drivers of sales along with the inventory of each of the one or more products.

7. The method of claim 5, wherein the dependent matrix comprises number of columns that equal to number of products and each column represents individual product sales.

8. The method of claim 5, wherein the demand transfer value is used to modify the number of facings which is in proportion to the demand transfer values and also to provide visibility on demand transference that happens across different products.

9. A non-transitory computer readable medium storing one or more instructions which when executed by a processor on a system, cause the processor to perform method comprising:

collecting, via one or more hardware processors, a set of drivers of sales of a plurality of products of a predefined category from one or more sources of information, wherein the one or more source of information includes a point of sale (POS), an inventory management, a historical promotion, a competitor information, a demography of the point of sale and store level weather information;

aggregating, via one or more hardware processors, the collected set of drivers of sales of the plurality of a predefined category and a recorded sales of each product within a predefined time period, wherein the set of drivers of sales include a demographic data associated with the plurality of products and a recorded information of one or more competitors of the plurality of products;

generating, via one or more hardware processors, a data matrix of the aggregated set of drivers to provide a multivariate multi-structure, wherein the data matrix comprises a plurality of columns and rows of the aggregated set of drivers of sales of the plurality of products of the predefined category and the recorded sales of each product within the predefined time period, wherein the data matrix includes an independent matrix and a dependent matrix, and wherein the independent matrix comprises number of rows that depends on a level of aggregation on a day or a week or a month;

processing, via one or more hardware processors, the aggregated data from the collected set of drivers of sales of the plurality of a predefined category and a recorded sales of each product within a predefined time period to facilitate the data matrix to improve demand transfer accuracy;

analyzing, via one or more hardware processors, the processed data using a multivariate multi-structure machine learning model to enable simultaneous consideration of each of the one or more products behavior with respect to other products availability, wherein the multivariate multi-structure machine learning model is generated by passing the data matrix into the multivariate multi-structure machine learning model;

generating, via one or more hardware processors, one or more scenarios by simulating one or more missing products and the aggregated set of drivers of sales of the one or more products of the predefined category;

estimating, via one or more hardware processors, a sale of each product corresponding to availability of inventory of each of the one or more products of the predefined category and the generated one or more scenarios using the multivariate multi-structure machine learning model, wherein the multivariate multi-structure machine learning model is learnt to estimate sales pattern across products for different scenarios by:

determining error between the estimated product sale and actual product sale;

identifying an optimal aggregation level in which the error is minimal by performing repeated iterations;

iteratively finding and stabilizing an optimal multivariate multi-structure based on the identified optimal aggregation level for the different scenarios; and iteratively learning the multivariate multi-structure machine learning model based on the optimal multivariate multi-structure for the different scenarios and sales performance at individual product level when all products are available and when some of the products are missing while considering all other available causative factors; and estimating, via one or more hardware processors, a demand transfer of each product using the estimation of each product using the one or more generated scenarios and estimated sale of each product corresponding to availability of inventory of each of the one or more products of the predefined category.

* * * * *